United States Patent [19]
Uhl et al.

[11] Patent Number: 6,112,165
[45] Date of Patent: Aug. 29, 2000

[54] METHOD OF OPERATING A DEVICE FOR MONITORING VEHICLE-TIRE PRESSURES AND INDICATING CHANGES IN PRESSURE BY RADIO

[75] Inventors: Günter Uhl, Helmstadt-Bargen; Norbert Normann, Niefern-Öschelbronn; Gunter Lothar Schulze, Ispringen; Ralf Kessler, Pfinztal, all of Germany

[73] Assignee: DODUCO GmbH, Pforzheim, Germany

[21] Appl. No.: 08/981,892

[22] PCT Filed: May 29, 1996

[86] PCT No.: PCT/EP96/02304

§ 371 Date: May 11, 1998

§ 102(e) Date: May 11, 1998

[87] PCT Pub. No.: WO97/00784

PCT Pub. Date: Jan. 9, 1997

[30] Foreign Application Priority Data

Jun. 21, 1995 [DE] Germany .............. 195 22 486

[51] Int. Cl.[7] ........................................ B01C 23/02
[52] U.S. Cl. .............. 702/138; 73/146.5; 73/146.3; 340/447
[58] Field of Search ................ 702/138; 73/146.5, 73/146.3, 146.2, 146.4; 340/447

[56] References Cited

U.S. PATENT DOCUMENTS

| 5,109,213 | 4/1992 | Williams | 340/447 |
| 5,656,993 | 8/1997 | Coulthard | 340/442 |
| 5,965,808 | 10/1999 | Normann et al. | 73/146.5 |

*Primary Examiner*—Marc S. Hoff
*Assistant Examiner*—Hien Vo
*Attorney, Agent, or Firm*—Orum & Roth

[57] ABSTRACT

A method of operating a device for monitoring vehicle-tire pressures and indicating changes in pressure by radio, which is arranged in the valve of the pneumatic tire and contains a power source; a pressure sensor; an analog/digital converter for digitizing the pressure signal obtained from the pressure sensor; a memory for storing the pressure signal; a transmitter; a comparator, in particular in a module with a microprocessor, which compares the pressure signal with a previously stored comparison pressure signal, generates a signal if the deviation of the pressure signal from the comparison pressure signal exceeds a threshold, and activates the transmitter, which thereupon transmits a datum regarding the detected deviation to a receiver arranged in the vehicle; and a timing switch which activates the device at time intervals for a measurement and comparison operation and otherwise keeps it deactivated for purpose of power conservation. The comparator stores the pressure signal and, with said pressure signal, constitutes a new comparison pressure signal which replaces the previous comparison pressure signal.

12 Claims, No Drawings

METHOD OF OPERATING A DEVICE FOR MONITORING VEHICLE-TIRE PRESSURES AND INDICATING CHANGES IN PRESSURE BY RADIO

The invention proceeds from a method having the features indicated in the preamble of claim 1. A method of this kind is known from DE 43 03 583 A1. This document discloses a device having means, arranged in a valve of the pneumatic tire, for generating a wirelessly transmittable pressure decrease indication signal with a battery as power source; having a preferably semiconducting piezoresistive pressure sensor; having an analog/digital converter for digitising the pressure signal obtained from the pressure sensor; having a memory for storing the pressure signal; having a comparator which compares the pressure signal with a previously stored comparison pressure signal; having a transmitter; and having a timing switch which activates the device from time to time and otherwise keeps it deactivated for purpose of power conservation. The analog/digital converter, memory, comparator, and timing switch are preferably realised in a module with a microprocessor which compares the pressure signal supplied by the pressure sensor with the previously stored comparison pressure signal, generates a signal if the deviation of the pressure signal from the comparison pressure exceeds a threshold, and then activates the transmitter, which thereupon transmits a datum regarding the detected deviation to a receiver arranged in the vehicle, in particular in the region of the dashboard, which processes the datum and indicates to the driver the pneumatic tire in which the air pressure is deviating significantly from the comparison pressure. The nominal pressure of the pneumatic tire is stored permanently, as the comparison pressure, each time the air pressure is checked, at a filling station, by means of an external gauge and set to its nominal value by means of a compressed air source.

The practical applicability of such a device to the monitoring of tire pressure depends on the fact that the device uses so little power that it is capable of operating for several years without a battery change. The transmitter has the greatest power consumption. With the known device, it is activated only if the deviation of the measured tire pressure from the nominal value exceeds a defined threshold. In addition, the pressure is measured not continuously, but instead only at regular intervals, for example every four seconds, and compared with the nominal value. The nominal value is an absolute value. It is stored each time air is added to the tire. For this purpose, the movement of the valve plunger is automatically monitored, for example by means of a magnet attached to the valve plunger, which actuates a magnetic switch when the valve plunger moves. When the device recognises a movement of the valve plunger, the tire pressure measured thereafter is stored as the comparison pressure.

Despite its power-saving operation, the known device has many disadvantages:

The tire pressure changes not only as a result of leakage, but also because of differences in vehicle loading and in response to tire temperature, which depends on driving conditions. If the tire is filled at low temperature, the pressure then rises as the outside temperature rises, but also as a result of tire flexing during driving. If, on the other hand, the tire is filled after having been driven, or on a hot day, the pressure then decreases with decreasing temperature, or if the vehicle is stationary or is driven slowly. This means that with a low threshold value, the transmitter is activated more often than necessary simply due to changes in tire temperature, resulting in unnecessary power consumption which reduces battery service life. This could be counteracted by raising the threshold value, but that degrades the reliability of the tire pressure monitoring system. Another possibility, disclosed in DE 43 03 583 A1, is to additionally arrange a temperature sensor in the valve of the pneumatic tire, and by means of said sensor to compensate by calculation, taking into account the known temperature dependence of air pressure, for the change in tire pressure caused by changes in temperature. This complicates the device, however, which is already quite complex due to the need to be integrated into the valve, and increases the latter's susceptibility to malfunction. Also disadvantageous is the fact that the movement of the valve plunger must be monitored by a separate sensor. This again makes the construction of the valve more complex.

The known device is sensitive to operating errors. If the driver fills the tire to an incorrect air pressure, the incorrect air pressure is automatically stored as the nominal value, and the air pressure is consequently compared with the incorrect nominal value.

With the known device, analysis of the pressure signal takes place entirely in the valve. Each signal that is sent from the device in the valve to the receiver is a warning signal. Higher-order boundary conditions for analysis, e.g. vehicle loading, cannot be defined.

It is the object of the present invention to optimise the monitoring of the air pressure in pneumatic tires by means of a monitoring device, arranged in the valve and signalling in wireless fashion, with no impairment in battery service life.

This object is achieved by means of a method having the features indicated in claim 1. Advantageous developments of the invention are the subject of the dependent claims.

According to the invention, the monitoring device provided in the valve does not store, as the comparison pressure signal, an absolute nominal value of the air pressure; accordingly, the monitoring device provided in the valve also does not determine and signal the deviation of the current tire pressure from the nominal pressure; instead, only any existing drift of the tire pressure is detected and, if applicable, signalled, and for this purpose, the comparison pressure signal is continuously adapted and only the further drift of the air pressure in the tire is sensed and, if applicable, signalled. In the simplest case, the current measured pressure is stored as the comparison pressure, and at the next pressure measurement the then-current pressure is compared with the comparison pressure stored previously. In order to compensate for random measurement errors and to prevent unnecessary activation of the transmitter, however, it may be advantageous to constitute the comparison pressure signal not solely from the last pressure signal previously supplied by the pressure sensor, but from multiple pressure signals previously supplied by the pressure sensor, for example by averaging the last three pressure signals that were measured and stored.

In order to allow a procedure of this kind, the monitoring device preferably contains a microprocessor or an ASIC; instead of this, however, the device could also contain some other electronic control circuit which makes possible the procedure according to the invention.

The procedure according to the invention has advantages:

Changes in tire pressure which occur so slowly that they are not hazardous do not in any circumstances lead to activation of the sensor. This applies in particular to pressure changes which are caused by temperature changes. These changes proceed so slowly that despite a low threshold for the pressure deviation (at present, a pressure threshold between 10 and 100 mbar is possible with tolerable complexity) and periodic pressure measurement at time intervals which are optimally between 1 second and 10 seconds, and even without the need for temperature compensation of the pressure measurement, pressure changes caused by temperature do not cause the transmitter to activate. This simplifies the construction of the monitoring device in the valve, and spares the battery.

Drift as a result of unavoidable diffusion of air out of the tire, which is by far the commonest reason why air needs to be added to a tire, also takes place so slowly that it does not cause activation of the transmitter. The situation is different in the existing art: there, if the tire pressure has dropped, due to gradual, continual diffusion, to the point that the pressure loss exceeds the threshold value, the transmitter is then activated at every subsequent measurement (taking place, for example, every four seconds) because the threshold value has been exceeded; this continues until the driver has visited a filling station and corrected the tire pressure. Until then, however, a great deal of power from the battery is used for transmission. According to the invention, however, a slow drift in tire pressure caused by diffusion does not lead to activation of the transmitter. A hazardous situation is nevertheless not caused as a result, because such slow pressure losses can be identified and corrected by means of checks occurring at longer intervals, for example at each fill-up. In an advantageous development of the invention, however, the check is not left to the driver on the occasion of a fill-up, but instead—regardless of whether the threshold has or has not been exceeded—the transmitter makes a report of the current tire pressure, at time intervals which are long compared with the time intervals at which the air pressure is regularly checked, to the receiver provided at a central point in the vehicle, in which the signalled pressure values are processed and evaluated. A slow drift of the tire pressure is thus sensed, at reasonable time intervals which spare the battery in the valve, and displayed to the driver, for example with an advisory which states appropriately: "Please increase right front tire pressure at next fill-up." Suitable time intervals at which a datum regarding tire pressure is sent in any event, regardless of whether a predefined threshold has been exceeded, are between one minute and one hour, the longer time intervals being particularly preferred.

The construction of the valve is thereby simplified, since a sensor to monitor the movement of the valve plunger is not required.

Because a comparison with an absolute nominal value of the air pressure is not performed in the monitoring device in the valve, what must be performed at each point is also not a complete analysis but rather simply a drift check. Everything else can be entrusted to a central analysis computer. This has the further advantage that the tire pressure check is more reliable and is independent of operating errors when adding air to the tire, and of calibration errors in the gauge on the air pump. If the comparison with a predefined absolute nominal pressure takes place only in a central computer, the latter can also indicate errors during filling, and allow immediate correction; in addition, centralised parameters can be taken into account, for example the loading state (cargo weight, in particular in the case of commercial vehicles; number of persons on board, in the case of buses and passenger cars).

Rapid pressure losses due to damage to the tire or its valve are particularly hazardous to driving safety. Pressure losses of this kind can be identified with particular reliability with the method according to the invention, since the measurement intervals (the "first" time intervals) can be short, and the threshold value low, without shortening the battery service life that is possible with the existing art. In an advantageous development of the invention, provision is made for the "first" time intervals to be shortened as soon as a pressure loss exceeding the threshold value is determined. A single pressure loss reading exceeding the threshold could be due to a random measurement error. In order to rule out random warning signals, it is advantageous, after a pressure drop reading which exceeds the threshold value, to clarify the situation by causing further measurements to be made at a higher measurement rate. If the subsequent measurements confirm the pressure drop, a warning signal can be sent very quickly. If the subsequent measurements do not confirm the pressure drop, however, it is clear that an incorrect measurement was present, and the transmitter is not even activated. In this manner the battery is spared with no impairment of safety, and the driver is not irritated by incorrect measurements.

In the same way that a pressure loss exceeding the threshold can be detected, a pressure rise exceeding the threshold value can also be detected. This usually relates to the tire filling procedure. In this case, transmission of a signal reflecting the tire pressure can be postponed until the tire pressure has stabilised, i.e. until the tire filling procedure is complete.

Once the pressure loss and the pressure rise again drop below the threshold value, the time intervals at which the tire pressure is checked by the monitoring device arranged in the valve are once again lengthened.

A distinction may be made among the following operating states:

1. Baseline state

The tire pressure has a nominal value $p_0$ and is constant. The state is present before the vehicle begins to move, and at low speed. At regular time intervals $t_0$, the tire pressure is measured and compared with the most recently measured value. As long as no change is detected between the two values, data transmission from the valve via the transmitter to the receiver is not necessary. Even small differences between the two pressure values, e.g. those caused by the data sensing system or by a change in temperature, do not cause a data transmission to the receiver, as long as the differences do not exceed a threshold $\Delta p_0$. The most recently measured pressure value is stored in place of the previously measured value, so as then to be compared with the next reading. Instead of the most recently measured pressure value, the mean of a plurality of previously measured pressure values can also be used for comparison with the current pressure reading.

At regular "second" time intervals $T_0$, a complete data telegram containing the current pressure reading is transmitted via the transmitter to the receiver, regardless of whether the threshold has been exceeded. This regular transmission, occurring at longer time intervals, is for purposes of system monitoring, and makes it possible to determine the magnitude of any gradual drift in the tire pressure.

Typical numerical values are:

for $t_0$: 1 to 10 seconds for $T_0$: 1 to 60 minutes for $\Delta p_0$: 10 to 100 mbar.

2. Vehicle in motion without pressure loss

As the vehicle begins to move, the tire pressure has an initial value $p_0$. As a result of normal flexing which occurs during driving, the tire and thus the air in the tire heat up to a greater or lesser extent depending on speed. This leads to an increase in the pressure in the tire, so that the current tire pressure is higher than the initial pressure po and fluctuates as a function of vehicle speed and road surface. The resulting changes in tire pressure occur so slowly that during the "first" time intervals $t_0$, the pressure change does not reach the threshold $\Delta p_0$ and the transmitter is therefore not activated. A datum concerning the pressure in the tire is nevertheless sent to the receiver at the time intervals $T_0$, along with the data telegram which also serves the purpose of system monitoring. From the information contained in the data telegram regarding the absolute tire pressure, a computer provided in the receiver recognises and evaluates slow pressure changes in all tires of the vehicle, in particular in the tires on a common axle, and thus recognises the pressure changes resulting from normal flexing work.

3. Vehicle in motion with gradual pressure loss

A gradual pressure loss is determined in the same manner as slow pressure changes while the vehicle is in motion without pressure loss. A gradual pressure loss is recognised by the computer in the receiver on the basis of the absolute pressure readings, and from a comparison among the pressure readings of the tires.

4. Rapid pressure loss

If a rapid pressure loss occurs while the vehicle is in motion or at a standstill, due to damage to the tire or the valve, the drift in the pressure is then so great that the pressure change from the most recently constituted comparison pressure signal to the current pressure signal exceeds the defined threshold. In this case a corresponding signal indicating the pressure drop could be sent immediately to the receiver. In order to rule out random incorrect measurements, however, a signal is preferably not sent to the receiver immediately after the threshold value has been exceeded; instead, the measurement rate is first increased, i.e. the "first" time intervals are shortened, in particular to values between 1 and 100 milliseconds. If the subsequent measurements, preferably the subsequent two to ten measurements, confirm that the threshold has been exceeded, the transmitter is then activated and the pressure signal is sent to the receiver. When the measurements at the higher rate are made, consideration must of course be given to the fact that within the shorter time intervals, the threshold must be correspondingly reduced for the same rate of pressure decrease. Because of the limited sensitivity of the pressure sensor, this is generally not possible to the required extent. In such a case it is therefore more favourable to continue using as the comparison pressure signal the comparison pressure signal most recently constituted before the "first" time interval was shortened, until the time span $t_0$ has elapsed or until the "first" time interval has once again been lengthened to its original value $t_0$.

Another possibility is to send a pressure signal, at the elevated measurement rate, whenever the pressure reading has changed by a certain magnitude, for example by 10 to 100 mbar. If no further change in the pressure is detected (pressure change is less than the threshold $\Delta p_0$), then either measurement continues for a certain period, or a defined number of readings is taken at the elevated measurement rate and the system then switches back to the original measurement rate $t_0$.

The system can also be switched back to the low measurement rate if the pressure reading exceeds a defined maximum value of, for example, 5 bars or falls below a defined minimum value of, for example, 1 bar. The system can then be switched back to the elevated measurement rate if the pressure readings rise or fall significantly.

5. Adding air

When air is added, the pressure change occurs so quickly that at a normal measurement rate ("first" time intervals between 1 and 10 seconds), the threshold value (between 10 and 100 mbar) is regularly exceeded. The procedure can therefore be the same as with a rapid pressure loss. Since the filling procedure is generally uncritical, it is also possible to delay sending a pressure measurement until the tire pressure has stabilised again, which indicates completion of the filling operation.

6. Theft monitoring

A further advantage of the invention is that it can be utilised to monitor the vehicle's wheels for theft. Even when the vehicle is not moving, the monitoring devices in the valves send, at least at the "second" time intervals, a data telegram with a status datum to the central receiver in the vehicle. If a wheel is stolen, the data telegram is absent; this is detected by the analysis circuit in the central receiver, which can respond with an alarm.

What is claimed is:

1. A method of operating a device for monitoring vehicle-tire pressures and indicating changes in pressure by radio, which is arranged in the valve of the pneumatic tire and contains a power source;

a pressure sensor;

an analog/digital converter for digitizing the pressure signal obtained from the pressure sensor;

a memory for storing the pressure signal;

a transmitter;

a comparator, in particular in a module with a microprocessor, and a timing switch, wherein the timing switch activates the device at the time intervals for a measurement and comparison operation and otherwise keeps it deactivated for purpose of power conservation, the pressure sensor submits a pressure signal to the comparator, the comparator compares the pressure signal with a previously stored comparison pressure signal, generates a signal if the deviation of the pressure signal from the comparison pressure signal exceeds a threshold, activates the transmitter, which thereupon transmits a datum regarding the detected deviation to a receiver arranged in the vehicle, stores the pressure signal and constitutes, with said pressure signal, a new comparison pressure signal which replaces the previous comparison pressure signal, and wherein the comparison pressure signal is constituted by averaging a number of pressure signals previously supplied by the sensor.

2. The method as defined in claim 1, wherein the timing switch activates the device at time intervals of between 1 second and 10 seconds.

3. The method as defined in claim 1, wherein the timing switch activates the transmitter at "second" time intervals which are long as compared with the "first" time intervals, and causes it to send out a status signal even if a deviation exceeding the threshold value has not been detected.

4. The method as defined in claim 3, wherein the "second" time intervals are between 1 minute and 1 hour.

5. The method as defined in claim 1, wherein the threshold value and the "first" time intervals at which the device is activated are matched to one another such that the quotient of the threshold value and the "first" time interval is large as compared with rates of change in tire pressure which typically occur, in the absence of leakage in the tire or valve, as a result of changes in tire temperature while the vehicle is being operated.

6. The method as defined in claim 1, wherein a gradual pressure loss that lies below the threshold value is determined by analysis of the tire pressure data sent at the "second" time intervals.

7. The method as defined in claim 1, wherein if a pressure loss exceeding the threshold value is detected, the "first" time intervals at which pressure measurement and comparison operations occur in the device are shortened, and the transmitter is activated if a number of subsequent pressure measurement and comparison operations, at the shortened time intervals, confirm that the threshold has been exceeded.

8. The method as defined claim 1, wherein if a pressure rise exceeding the threshold value is detected, the "first" time intervals at which pressure measurement and comparison operations occur in the device are shortened, and the transmitter is activated if a number of subsequent pressure measurement and comparison operations, at the shortened time intervals, confirm that the threshold has been exceeded.

9. The method as defined in claim 8, wherein the transmitter is not activated until after the tire pressure has stabilised at a higher level.

10. The method as defined in claim 7, wherein during operation with shortened "first" time intervals, a new comparison pressure signal is not constituted until after an unshortened "first" time interval has elapsed.

11. The method as defined in claim 7, wherein if the pressure loss or pressure rise drops below the threshold again, the "first" time intervals are again lengthened.

12. The method as defined in claim 1, wherein the absolute tire pressure values are processed and evaluated in the receiver, whereas the device arranged in the valve simply evaluates the measured tire pressure values in terms of any drift in the tire pressure.

* * * * *